Jan. 29, 1952 W. T. HAYNES 2,583,647
MOTOR VEHICLE ROAD MAP SUPPORT
Filed Dec. 16, 1947 2 SHEETS—SHEET 2
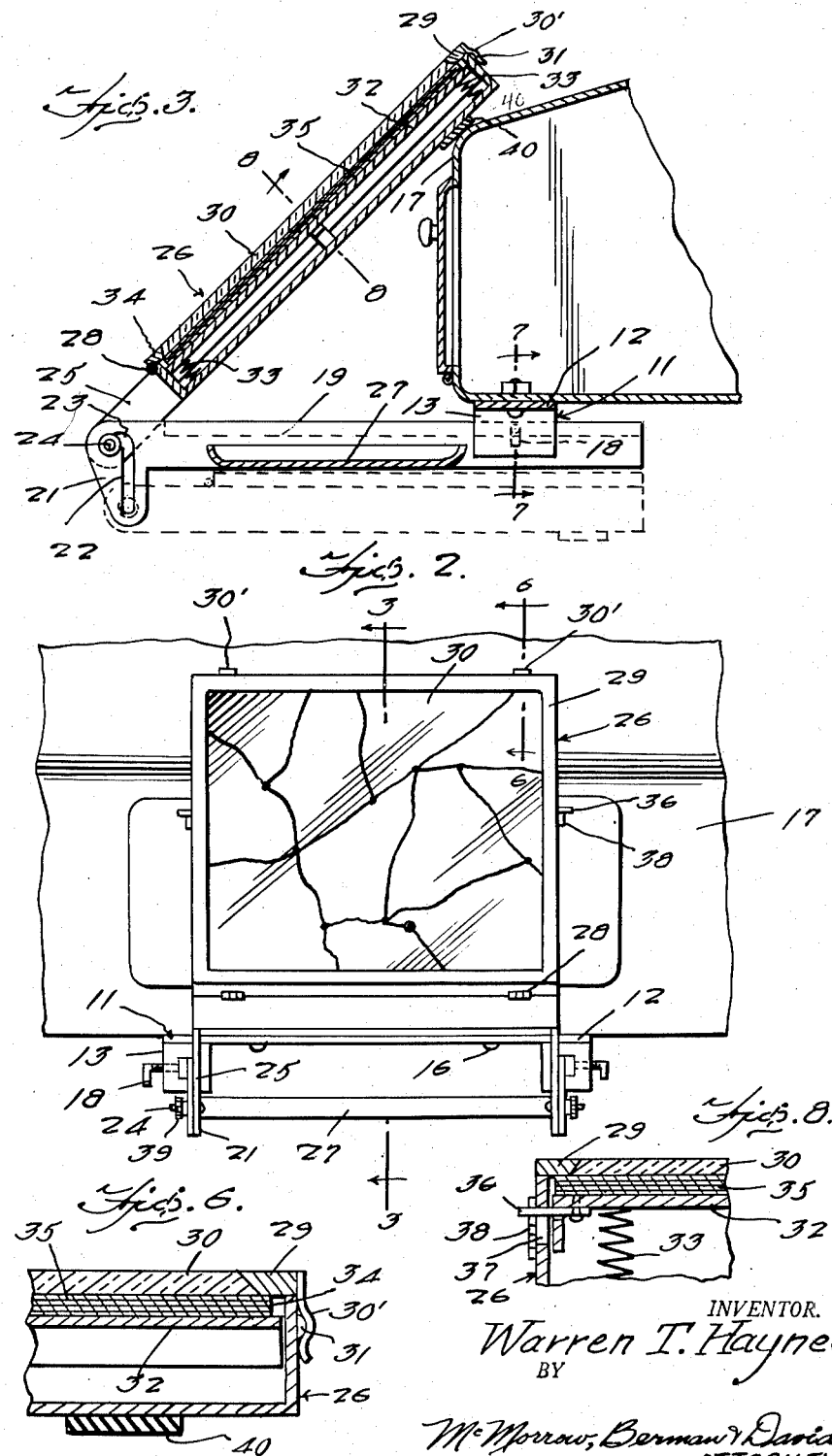
INVENTOR.
Warren T. Haynes
BY
McMorrow, Berman & Davidson
ATTORNEYS Patented Jan. 29, 1952

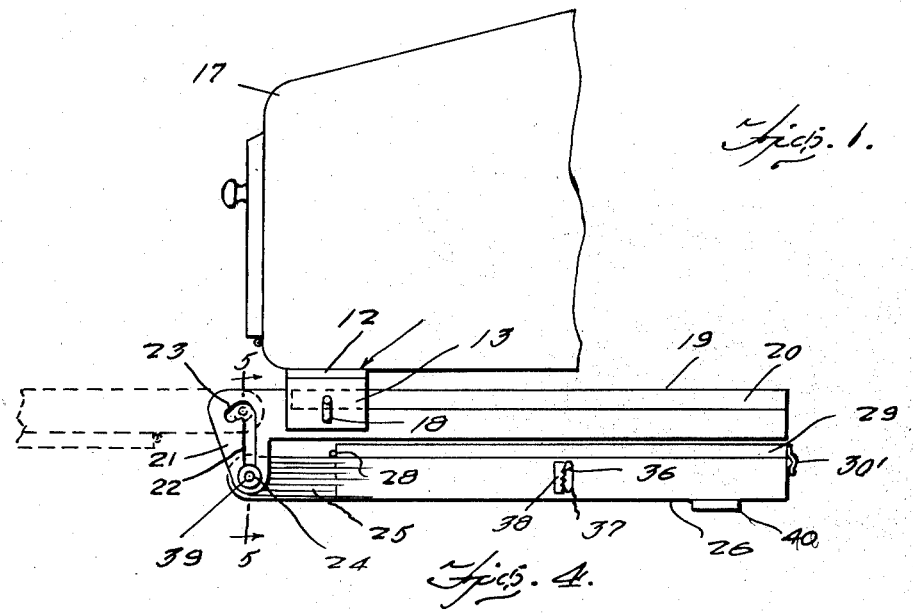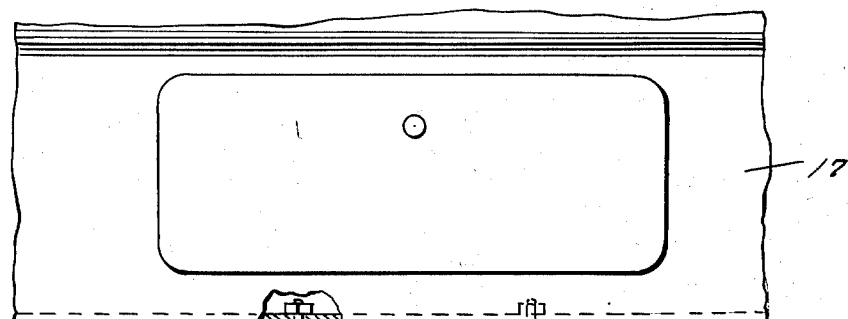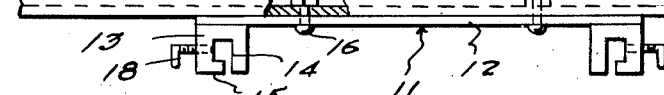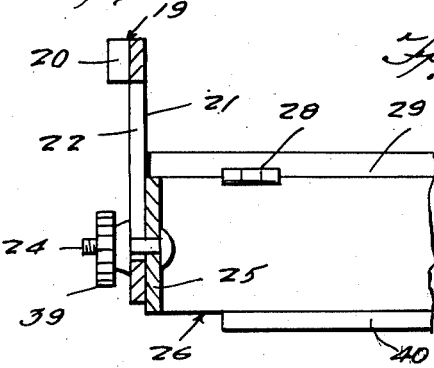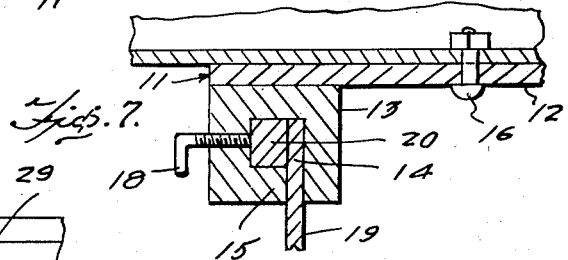

2,583,647

UNITED STATES PATENT OFFICE 2,583,647

MOTOR VEHICLE ROAD MAP SUPPORT

Warren T. Haynes, Longview, Wash.

Application December 16, 1947, Serial No. 792,027

3 Claims. (Cl. 40—10)

This invention relates to map display devices, and more particularly to a road map display device for use in automobiles.

A main object of the invention is to provide a novel and improved road map display device for use in automobiles, said display device being clearly visible to the driver of the automobile when set up in its operative position, and being readily foldable to an inoperative position when its use is no longer required, the device being simple in structure, easy to install and requiring only a small amount of space in the automobile.

A further object of the invention is to provide an improved map display device for automobiles which may be fastened to the bottom of the instrument panel of an automobile and may be readily moved into visible position, the device also at times functioning as a tray for food or the like, and being inexpensive to manufacture, compact in size and sturdy in construction.

Further objects and advantages of the invention will become apparent from the following description and claims, and from the accompanying drawings, wherein:

Figure 1 is an end view of a map display device according to this invention, shown attached to the bottom of an automobile instrument panel and folded to an inoperative position.

Figure 2 is a front elevational view of the map device of Figure 1, said device being shown in operative position.

Figure 3 is a transverse cross-sectional view taken on line 3—3 of Figure 2.

Figure 4 is a front elevational view, partly in cross-section, of a fragmentary portion of an automobile instrument panel, showing the supporting bracket for the map display device illustrated in Figures 1 to 3.

Figure 5 is an enlarged cross-sectional detail view taken on line 5—5 of Figure 1.

Figure 6 is an enlarged cross-sectional detail view taken on line 6—6 of Figure 2.

Figure 7 is an enlarged cross-sectional detail view taken on line 7—7 of Figure 3.

Figure 8 is an enlarged cross-sectional detail view taken on line 8—8 of Figure 3.

Referring to the drawings, 11 designates a supporting bracket comprising a flat bar member 12 having secured to its end portions the respective depending guide blocks 13, 13. Each guide block 13 is formed with a groove 14 extending transversely to the bar member 12 and projecting inwardly from the outer legs of the blocks are ribs 15, 15 whereby the grooves 14, 14 are right-angled in cross-section, as shown in Figure 4. Bar member 12 is secured by bolts 16, 16 to the underside of the instrument panel 17 of an automobile, preferably subadjacent the glove compartment thereof, as shown in Figure 4.

Threaded through the outer arm of each guide block 13 is a manually operable set screw 18.

Designated at 19, 19 are rail members formed with enlarged rib portions 20, the upper portions of said rail members, including the enlarged rib portions 20 slidably fitting the grooves 14, 14 and adapted to be supported therein either in retracted positions, as shown in Figure 1, or in forwardly extended positions, as shown in Figure 3. The set screws 18 are employed to lock the rail members 19 in their selected positions of adjustment.

The rail members 19 are formed at their forward ends with flat vertical depending arms 21. Arms 21 are formed with slots which have vertical portions 22 and terminate at their top ends in forwardly directed semi-circularly curved portions 23. Pivotally and slidably secured to arms 21 by means of bolts 24 extending through the slots are the parallel ears 25, 25 carried by and projecting from a map exhibiting case, shown at 26.

Secured transversely to the lower portions of the rail members 19, 19 and spaced below the plane of the bottom surfaces of the guide blocks 13, 13 is an upwardly concave channel or tray member 27 which rigidly unites the rail members and also serves at times as a support for food or other articles, as will be subsequently described.

Map case 26 comprises a generally rectangular flat housing having hinged thereto at 28 a top cover frame 29 which carries a transparent panel 30 of glass or other suitable transparent material. The cover frame 29 has secured to its edge opposite the hinge 28 a pair of depending spring detent fingers 30', 30' resiliently engageable with projections 31 on the adjacent wall of the case for releasably securing the transparent cover in closed position.

Designated at 32 is a follower plate slidably fitting inside the case 26 and biased toward the transparent cover of the case by a plurality of coil springs 33 compressed between the plate 32 and the bottom wall of the case. Said springs are preferably fastened to the bottom wall of the case adjacent the corners thereof. Stop ribs 34 are secured inside the case adjacent its forward and rear rim edges and retain the follower plate 32 against outward movement. The road map is shown at 35, said map being suitably folded to expose the desired area through the panel 30, and being clamped between the glass panel 30 and follower plate 32 by the action of biasing springs 33.

Secured to the side portions of follower plate 32 at their mid-points are laterally projecting resilient pins 36 extending through vertical slots 37 formed in the side walls of case 26 and engaging ratchet bars 38 secured to said side walls.

When it is desired to releasably lock the follower plate 32 in a depressed position in case 26, as when changing maps or the like, the follower plate is pushed downwardly with the pins 36 engaging the teeth of the ratchet bars 38 to retain the plate 32 in its depressed position. After the map has been replaced or refolded to exhibit a new area, the transparent cover is closed and the pins 36 are manually flexed to release them from the ratchet bars 38, whereby springs 33 restore the follower plate 32 to its map clamping position.

When the device is not in use it is positioned under the instrument panel 17 in the retracted position of rail members 19 shown in Figure 1, with the map case 26 folded beneath the rail members and secured in this position by friction nuts 39 threaded on the pivot bolts 24. The set screws 18, 18 are employed to lock the rail members in said retracted position, as above explained. By loosening set screws 18, 18, the rail members may be extended forwardly, and when locked by set screws 18, 18 in their forwardly extended positions, support the tray member 27 in a usable position. By loosening friction nuts 39, 39 the map case 26 may then be swung clockwise, as viewed in Figure 1 and the pivot bolts 24, 24 may be raised and moved to the forward ends of the curved slot portions 23, whereby the map case 26 may be supported against the top corner of the instrument panel 17 in the manner shown in Figures 2 and 3. The map case may be locked in this position by tightening friction nuts 39, 39.

The map case 26 may be set to different angles of adjustment by locking rail members 19, 19 in different extended positions prior to swinging the map case into abutment with the upper corner of the instrument panel as described above. Secured to the bottom of the map container at the portion thereof which contacts said upper corner of the dashboard is a pad 40 of rubber, felt, or other suitable cushioning material which prevents rattling of the container and also prevents scratching or abrasion of the instrument panel.

Maps may be changed by opening the map case 26 either while it is in the inclined position of Figures 2 and 3 or by removing the map case and rail members 19, 19 from the guide blocks 13, 13.

While a specific embodiment of an automobile road map exhibiting device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an automobile map holder, a bracket having a pair of parallel guide blocks formed with longitudinal grooves, a pair of rails having portions slidably and supportably engaging said grooves, said rails having ears on one end thereof formed with slots having portions extending crosswise of the longitudinal axes of said rails, said ears projecting at one side of said rails, a map frame normally positioned along the said one side of said rails and positioned between said rails, bolts projecting from opposite edges of said map frame at one end thereof and pivotally and slidably engaging said slots, friction nuts on said bolts arranged to be tightened to lock the map frame relative to said rails, said friction nuts being arranged to be loosened to permit said map frame to be swung on the axes of said bolts away from a position along the said one side of said rails and moved along the crosswise portions of said slots to a position along the opposite side of said rails.

2. In an automobile map holder, a bracket comprising a pair of laterally spaced horizontal guide blocks formed with longitudinal grooves, a pair of horizontal rails having portions slidably and supportably interengaging said grooves whereby said rails can be slidably extended forwardly and rearwardly with respect to said guide blocks, depending portions on the forward ends of said rails formed with vertically extending slots terminating at their upper ends in forward offsets, a map frame normally occupying a position beneath said rails, ears on the forward end of said map frame positioned alongside of said depending portions, bolts on said ears extending pivotally and slidably through said slots whereby said map frame can be swung downwardly and forwardly from its normal position, shifted upwardly along said slots, to a position above said rails, with said bolts positioned in the slot offsets and then tilted rearwardly, and friction nuts on said bolts arranged to be tightened thereon to clamp said ears and said depending portions to hold said map frame in selected positions between the normal position of the map frame and the upwardly shifted and rearwardly tilted position thereof.

3. In a map holder, a frame comprising a bottom, sidewalls, and a marginal front wall forming a viewing opening, a transparent panel supported across said opening, a follower plate in said frame having side flanges positioned along the frame sidewalls, said follower plate being arranged to hold a map against said transparent panel, spring means compressed between the frame bottom and said follower plate and urging said follower plate toward said transparent panel, said frame sidewalls being formed with slots, toothed racks positioned along said slots, and flexible pins on the follower plate flanges projecting through said slots and selectively engageable with teeth of said selected racks whereby the follower plate is releasably retained in a spaced relation to said transparent panel against the resistance of said spring means, said pins being flexible out of engagement with teeth of the racks and engageable with other teeth of the racks to retain said follower plate in another spaced relation to the transparent plate.

WARREN T. HAYNES.

REFERENCES CITED

The following references are of record in the file of this patent:

UNITED STATES PATENTS

| Number | Name | Date |
| --- | --- | --- |
| 600,074 | Harding | Mar. 1, 1898 |
| 754,269 | Witt et al. | Mar. 8, 1904 |
| 866,158 | McIntyre | Sept. 17, 1907 |
| 1,257,790 | Bickerton | Feb. 26, 1918 |
| 2,170,013 | Detwiler | Aug. 22, 1939 |
| 2,270,557 | Randall | Jan. 20, 1942 |
| 2,379,975 | Luger | July 10, 1945 |